UNITED STATES PATENT OFFICE.

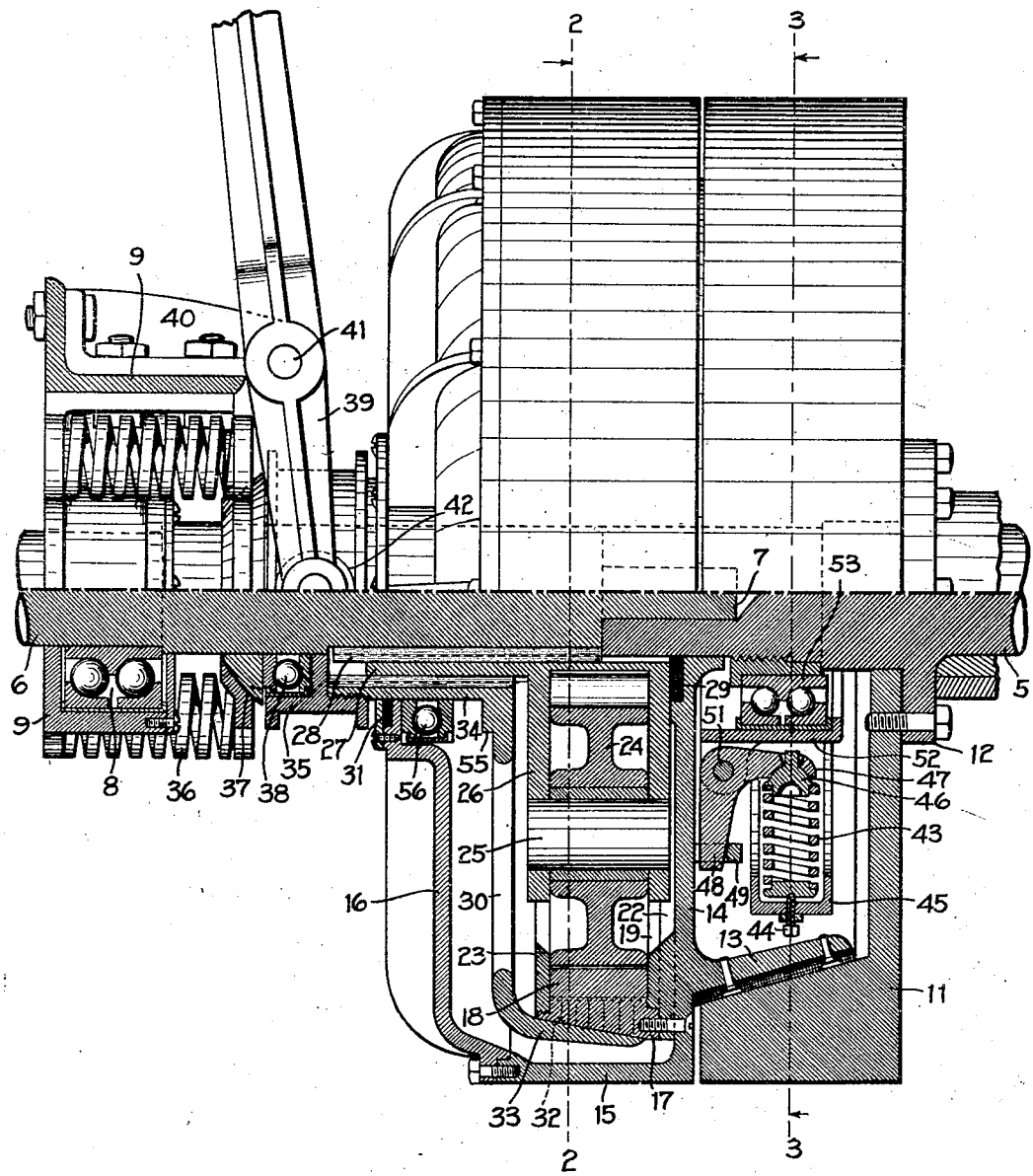

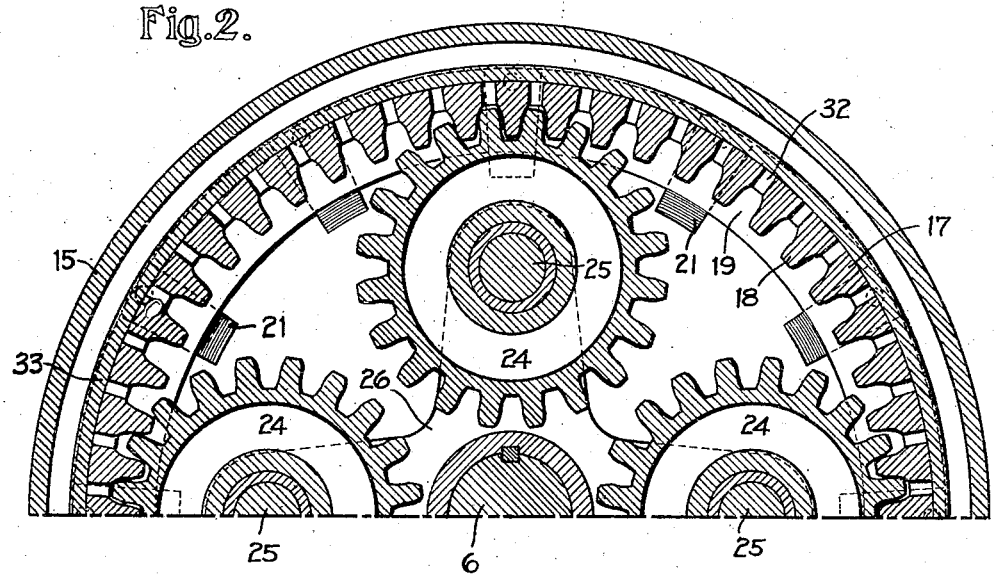
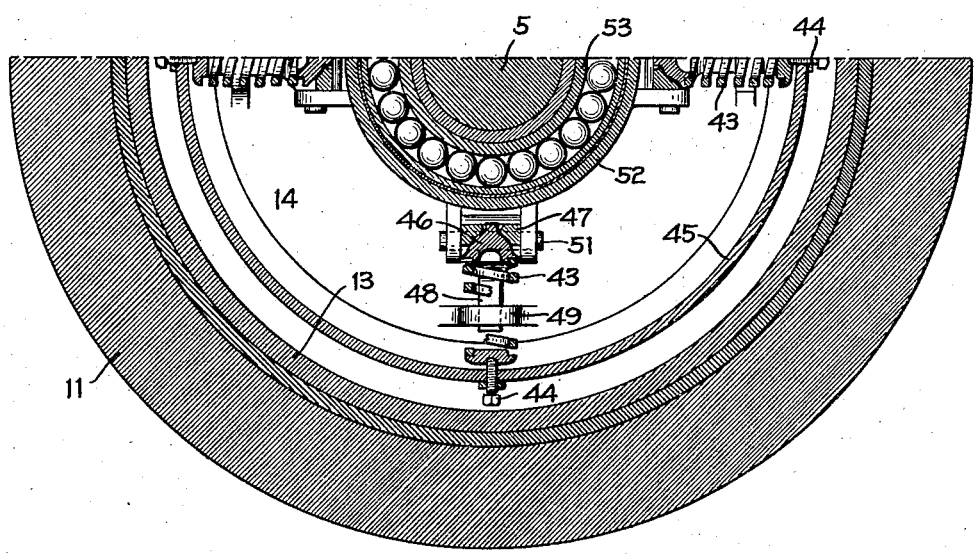

ARTHUR R. SELDEN, OF ROCHESTER, NEW YORK.

POWER-TRANSMISSION MECHANISM.

1,077,371.

Specification of Letters Patent.   Patented Nov. 4, 1913.

Application filed June 14, 1912.   Serial No. 703,758.

*To all whom it may concern:*

Be it known that I, ARTHUR R. SELDEN, a citizen of the United States, and resident of Rochester, in the county of Monroe and State of New York, have invented certain new and useful Improvements in Power-Transmission Mechanism, of which the following is a specification.

This invention relates to power-transmission mechanism for connecting two rotary elements and for controlling their relative movement.

One object of the invention is to produce mechanism in which novel means are employed for yieldingly connecting the rotary elements in such a manner as to permit a relative slip, whereby the speed ratio of the rotary elements may be varied without setting up destructive friction and in a uniform and smooth manner.

Another object of the invention is to provide for a smooth and uniform action in the power-transmission mechanism in taking up or releasing a load, so that there shall be no jerking or destructive strain upon the mechanism.

To these ends I employ a novel and simple arrangement operating hydraulically and characterized by the use of two or more intermeshing gears, these gears being so formed that their teeth provide, in effect, a series of dash-pots, these dash-pots being filled with fluid by which the relative rotation of the gears is yieldingly resisted.

Another object of the invention is to provide for a driving action varying in all degrees from positive driving, without slip, to complete freedom between the rotary elements, and to this end I combine, with the hydraulic mechanism just referred to, valve-mechanism for controlling the action of the hydraulic mechanism, and supplemental clutch-members which may be operated successively and in combination to produce the desired result.

Other objects of the invention, and the features of construction and arrangement by which these several objects are attained, will be set forth in connection with the following description of the illustrated embodiment of the invention.

In the accompanying drawings:—Figure 1 is a side-elevation of a power-mechanism embodying the present invention, the lower half of the figure being in vertical median section; Fig. 2 is a vertical section of the upper half of the mechanism, on the line 2—2 in Fig. 1, looking from left to right in the latter figure; and, Fig. 3 is a vertical section of the lower half of the mechanism, on the line 3—3 in Fig. 1, looking from right to left in the latter figure.

The invention is illustrated as embodied in a mechanism adapted particularly for use in connection with an automobile. The two rotary elements which may be, for example, the engine-shaft and the drive-shaft of an automobile, are illustrated as coaxial shafts 5 and 6, respectively, the bearings of the shaft 5 not being illustrated as they may be ordinary engine-shaft bearings. The shaft 6 is journaled, at one end, by means of a reduced extremity 7 fitting a recess in the end of the shaft 5, and turns, near the other end, in a ball-bearing 8, which is mounted upon a support or frame 9 which may be a part of the frame of the motor-vehicle. These two shafts are referred to in the appended claims as a "driving" element and a "driven element," respectively. The drive from the engine-shaft 5 to the shaft 6 is always through a clutch of which one member is constituted by the rim of a wheel 11 the web of this wheel being bolted to a flange 12 integral with the shaft 5. This wheel, as illustrated, is adapted to constitute the fly-wheel of the engine, and the inner surface of its rim is conical and coöperates with a conical clutch-member 13, which may be provided with suitable frictional material on its outer surface. The clutch-member 13 is integral with a disk 14, which is journaled loosely, at the center, upon the shaft 5. The clutch-member 13 is further supported by a drum or casing 15 integral with the disk 14, and a removable cover 16, which is bolted to the drum and which has a bearing, at its center, concentric with the shafts 5 and 6. The disk, the drum and the cover also constitute a fluid-tight casing for a purpose which will be presently described.

The hydraulic mechanism or yielding connecting-mechanism comprises an annular member 17 which is mounted upon the disk 14, within the casing just referred to. This member is provided with a series of gear-teeth 18 so as to constitute an internal gear. At the inner ends of these gear-teeth is an annular member 19 having a flat surface which is normal to the axis of rotation of the gear, and which closes the ends of the spaces between the gear-teeth and extends a short distance within the teeth. This member 19 is connected with the disk 14 by integral spacing-members 21, so as to provide a series of radial fluid-passages 22. The left-hand ends of the spaces between the gear-teeth are closed by a flat ring 23 which is threaded into the member 17, as shown in Fig. 1, and which also has a flat surface extending inwardly beyond the gear-teeth.

It will be apparent that the parts 17, 19 and 23 provide a series of fluid-receptacles between the successive gear-teeth 18, with which receptacles the teeth of a gear meshing with the internal gear are adapted to coöperate in the manner of pistons. To produce this result I employ four planetary pinions 24 which are loosely journaled upon shafts 25 carried on a four-armed spider 26. This spider has a central sleeve or hub 27, which is mounted upon the shaft 6 and is splined thereto by means of a key 28. By this arrangement the spider and the shaft 6 are caused to rotate together, while the spider is free to move longitudinally upon the shaft.

In order that a body of suitable fluid, such as oil or glycerin, may be retained within the fluid-casing, packing-washers 29 and 31 of suitable material are employed at the journals of the casing. It is not necessary to completely fill the casing, however, since centrifugal action will cause such fluid as is contained therein to flow to the periphery of the casing, where it will fill the spaces between the gear-teeth 18 and the members 19 and 23. When the shaft 5 rotates it acts, through the clutch-members 11 and 13, to rotate the internal gear 17, and since the pinions 21 are loosely journaled upon the spider they tend to rotate freely and yield to the movement of the internal gear. As each tooth of the planetary gears enters a space between the teeth of the internal gear, however, the fluid must be expelled from this space, and this fluid, therefore, exerts a yielding resistance to the relative rotation of the pinions and the gear. By forming the teeth of the planetary pinions to fit as closely against the faces of the teeth 18 and against the members 19 and 23 as is practicable consistently with commercial manufacturing methods, the resistances produced may be made very substantial, each pair of teeth acting, in effect, as a dash-pot, from which the only escape is afforded by the slight clearances essential to smooth operation, so that a drag is produced between the internal gear and the planetary gears which causes the spider 26 to be rotated, thus rotating the shaft 6. The fluid which is forced out from between the gear-teeth is held at the periphery of the casing by centrifugal action, so that it tends to again enter and fill such of the spaces between the gear-teeth 18 as are not engaged by the teeth of the planetary pinions.

The hydraulic mechanism, as so far described, constitutes a device by which the engagement of the driving connections between the driving and the driven rotary elements may be relieved from sudden and positive action, but it is desirable, in the embodiment of the invention illustrated in the drawings, to render the hydraulic connections adjustable in their action so that a variable resistance or drag may be produced. Accordingly, escape-passages 32 are formed radially in the member 17, extending from each of the spaces between the teeth 18. These passages terminate at the periphery of the member 17, which is conical in form. Coöperating with this conical surface is an annular conical member 33 which constitutes both a valve and a clutch-member. The member 33 is connected, by arms or spokes 30, with a central sleeve or hub 34 which is loosely mounted upon the hub 27 but is splined thereto as shown in Fig. 1. The hub 34 constitutes also the bearing for the center of the cover 16, and projects outwardly therefrom, and is provided at its outer end with an annularly grooved sleeve 35.

The member 33 is normally held in position to close the passages 32, and operative engagement between the clutch-members 11, 13, 17 and 33 is normally maintained, by means of an axial thrust due to a set of coiled springs 36. These springs are seated upon the frame 9, and they press against one member of a spherical joint 37, which in turn presses against the sleeve 35 through a ball-bearing 38. Normally, therefore, all of the conical clutch-members are held in firm engagement, so that a direct and comparatively unyielding drive may be had through these members from the shaft 5 to the shaft 6, and vice versa. The operation of the clutch-mechanism is controlled, however, by a lever 39 which is adapted for operation manually, or in any convenient manner. This lever is pivoted at 41 upon a bracket 40 fixed to the frame 9, and its lower forked end carries rollers 42 which engage the annular groove in the sleeve 35. When it is desired to drive through the yielding action of the hydraulic mechanism the upper end of the lever 39 is drawn slightly to the right, thus causing the sleeve 35 to be moved to the left against the resistance of the springs 36. This movement is transmitted through the sleeve 34 and the spokes 30 to the clutch-member 33, thus causing it first to disengage the conical outer surface of the member 17 sufficiently to interrupt the mechanical driving connection between these parts, but without substantially opening the escape-passages 32. The drive is now through the hydraulic mechanism, which acts with its greatest effect so as to provide for only a slight yielding, the shaft 6 being, therefore, driven with nearly the full torque of the shaft 5. By further movement of the clutch-lever 39, however, the member 33 is drawn farther from the outer surface of the member 17, so that the escape-passages are opened to provide a progressively freer escape for the fluid from between the gear-teeth, and accordingly the driving action of the hydraulic mechanism is progressively diminished in force, thus providing for a greater slip between the shafts 5 and 6, until the drag substantially disappears and the shaft 6 may come to rest, if subjected to a slight resistance.

During the hydraulic action of the clutch, as last described, it is necessary that the clutch-members 11 and 13 be maintained in operative engagement, and since the thrust of the springs 36 is not, at this time, transmitted to these clutch-members, a set of supplemental clutch-springs 43 is employed. These springs are supported, at their outer ends, by adjusting-screws 44 threaded into a channel-shaped ring 45, while their inner ends engage ball-and-socket members 46 seated in the ends of the inner arms 47 of a set of bell-crank levers, which are mounted upon pivots 51. The outer arms 48 of the bell-crank levers engage, respectively, eyes 49 projecting from the disk 14, so that the thrust of the springs is transmuted, through the bell-crank levers, into a right-hand pull upon the disk 14, which results, in turn, in forcing the clutch-member 13 into the clutch-member 11. The pivots 51 are supported in lugs on a sleeve 52, this sleeve being journaled upon the shaft 5 through a ball-bearing 53, and this ball-bearing supports the left-hand thrust or pull of the pivots 51.

The ring 45, by which the clutch springs 43 are supported, constitutes an effective equalizer for these springs, since it is itself supported only by the springs and is thus free to yield radially to compensate for differences in the strength of the springs. Accordingly, the springs act equally upon all parts of the clutch-members 13 and 11 so as to produce a firm and even engagement throughout their peripheries.

While the opening of the escape-passages in the hydraulic mechanism provides for substantially free rotation of the gears, it may be desirable to provide against even the slight friction due to their freest action, and accordingly provision is made for disengaging the clutch-members 13 and 11 so that all driving connections between the shafts 5 and 6 are interrupted. To this end the hub 34 is provided with a shoulder 55 which is adapted, when the clutch-lever 39 is moved to extreme right-hand position, to engage a ball thrust-bearing 56 which is mounted against the inner surface of the cover 16. By this engagement the cover and the drum 15 are caused to pull the clutch-member 13 to the left, against the resistance of the bell-crank levers and the springs 43, thus disengaging the clutch-member 13 from the clutch-member 11, and all parts of the hydraulic mechanism then come to rest with the shaft 6.

When the power-mechanism hereinbefore described is employed in connection with a motor-vehicle, the normal position of the parts is that illustrated in Fig. 1, the clutches being in operation to cause the engine to actuate the shaft 6, and thus to transmit power to the driving-wheels of the vehicle, either directly or through any suitable change-speed gearing. When it is desired to unclutch the engine from the gearing the upper end of the clutch-lever 39 is thrown to the right, to the full extent of its movement, thus throwing out both of the conical clutches and leaving the shaft 5 and the fly-wheel 11 free to rotate without actuating any other parts of the mechanism. In throwing the clutch-mechanism again into operative position the clutch-lever is allowed gradually to return to normal position under the influence of the springs 36, and the first effect of this movement is to cause the clutch-member 13 to engage its seat in the wheel 11, whereupon the hydraulic mechanism is thrown into operation. At this time, however, the clutch-member 33 is disengaged from its seat and the vent-openings 32 are wide open, and accordingly the fluid flows freely through these openings, and the hydraulic mechanism affords no substantial driving effect. As the movement of the clutch-lever continues, however, the escape-vents are gradually closed by the member 33, so that a gradually increasing torque is transmitted through the hydraulic mechanism to the shaft 6, and the vehicle is thus gradually started into motion without jar or strain upon the parts. When the clutch-lever finally returns to its normal position the member 33 is seated under the full force of the springs 36, so that thereafter the action of the mechanism is wholly mechanical and substantially unyielding, the hydraulic mechanism being thus eliminated from the normal operation of the mechanism. In addition to the function of stopping and starting the vehicle, the power-mechanism may be used to provide for slipping or lost motion between the engine and the traction-wheels, when it is desirable to reduce the speed of the vehicle without shifting the change-speed-gearing, or to reduce it to a speed lower than is readily permitted by such gearing. In this case the clutch-lever is moved from normal position sufficiently to disengage the clutch-member 33 from driving-connection with the member 17, so that the power is then transmitted through the hydraulic mechanism, and in this case a greater or less amount of lost motion or slipping is permitted in the mechanism by the leakage or escape of the fluid from between the gear-teeth, this effect being regulated by the extent to which the clutch-member 33 is moved to open the escape-vents.

While the hydraulic clutch-mechanism above described is preferably combined, as shown in the drawings, with frictional or positive clutch-mechanism for direct driving under normal conditions, it is not necessarily used in such connection, as it may be rendered sufficiently positive in its action for all driving purposes, at least in certain applications. It will be further apparent that the functions of clutch-member and controlling-valve are not necessarily combined in one member, such as the member 33 in the illustrated construction, since other forms of valve-mechanism may be employed, and the invention is not, in general, limited to the embodiment thereof hereinbefore described, but may be embodied in various other forms within the nature of the invention as it is defined in the following claims.

I claim:—

1. Power-transmission mechanism having, in combination with two rotary elements, yielding connections, between said elements, comprising: planetary pinions journaled on one element; an internal gear meshing with the pinions and connected with the other element, said gear being provided, at its opposite faces, with rigid closures for the ends of the spaces between its teeth, whereby a series of fluid-receptacles are formed into which the teeth of the pinions fit closely; and means for incasing the gear and the pinions to retain a body of fluid.

2. Power-transmission mechanism comprising intermeshing gears provided, at the ends of their teeth, with closely-fitting surfaces whereby a series of fluid-receptacles are produced between the teeth, means for incasing the gears to retain a body of fluid whereby the receptacles are filled so as to resist the relative rotation of the gears, the receptacles being provided with escape-passages for the fluid therein, and means for controlling said passages to provide adjustably for the escape of the fluid therethrough and vary said resistance.

3. Power-transmission mechanism having, in combination, a driving element and a driven element rotatable about a common axis, a pinion journaled concentrically on one of said elements, the other element being provided with a concentric gear meshing with the pinion, the gear and the pinion having closely-fitting surfaces at the ends of their teeth whereby a series of fluid receptacles are provided between the teeth, means for incasing the gear and the pinion to retain a body of fluid, and means for rotatively connecting the driving element and the driven element independently of the gear and the pinion.

4. Power-transmission mechanism having, in combination, a driving element and a driven element rotatable about a common axis; an annular member connected with one of said elements and provided with a series of gear-teeth, a conical clutch-surface, and a series of escape-passages extending from the spaces between the gear-teeth to said surface; a planetary gear carried by the second of said elements and loosely meshing with said gear-teeth; means for incasing a body of fluid in which the gears are immersed; a conical clutch-member rotatively connected with the second of said elements and coöperating with said clutch-surface and escape-passages; and means for moving said clutch-member into and out of frictional engagement with the clutch-surface so as both to provide a mechanical driving-connection between said elements and to control the escape-passages and regulate the operation of the gears.

5. Power-transmission mechanism having, in combination, two elements rotatable about a common axis and provided with coöperating clutch-members engageable by axial movement; and means for maintaining the clutch-members in engagement comprising a series of bell-crank levers connecting the clutch-members, a series of radially-arranged springs engaging the respective bell-crank levers, and an annular member engaging and mutually supporting said springs, said annular member being free to move radially in all directions so as to equalize the pressures of the several springs.

6. Power-transmission mechanism having, in combination, a driving element and a driven element rotatable about a common axis; an annular member provided with a series of gear-teeth, a conical clutch-surface, and a series of escape-passages extending from the spaces between the gear-teeth to said surface; a planetary gear carried by one of said elements and loosely meshing with said gear-teeth; means for incasing a body of fluid in which the gears are immersed; a conical clutch-member rotatably connected with said one of said elements and coöperating with said clutch-surface and escape-passages; a second set of clutch-members for connecting the annular member with the other of said elements; and manually-operable means adapted, by continuous movement in one direction, first to move said conical clutch-member out of engagement with said clutch-surface, and then disengage the second pair of clutch-members.

ARTHUR R. SELDEN.

Witnesses:
FARNUM F. DORSEY,
D. GURNEE.

Copies of this patent may be obtained for five cents each, by addressing the "Commissioner of Patents, Washington, D. C."